(12) United States Patent
Wang

(10) Patent No.: US 8,345,950 B2
(45) Date of Patent: Jan. 1, 2013

(54) SYSTEM AND METHOD FOR TESTING A MULTIMETER

(75) Inventor: Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 767 days.

(21) Appl. No.: 12/538,976

(22) Filed: Aug. 11, 2009

(65) Prior Publication Data

US 2010/0083729 A1  Apr. 8, 2010

(30) Foreign Application Priority Data

Oct. 8, 2008 (CN) .......................... 2008 1 0304771

(51) Int. Cl.
*G06K 9/00* (2006.01)
(52) U.S. Cl. ............................ 382/149; 348/125; 348/87
(58) Field of Classification Search .................. None
See application file for complete search history.

(56) References Cited

U.S. PATENT DOCUMENTS

| | | | | |
|---|---|---|---|---|
| 3,764,995 A | * | 10/1973 | Helf et al. .................. | 714/32 |
| 4,338,626 A | * | 7/1982 | Lemelson .................. | 348/94 |
| 5,790,696 A | * | 8/1998 | Takahashi .................. | 382/177 |
| 6,445,455 B1 | * | 9/2002 | Hall et al. .................. | 356/460 |
| 7,269,274 B2 | * | 9/2007 | Iwamura et al. .............. | 382/100 |

FOREIGN PATENT DOCUMENTS

EP 1959267 A1 * 8/2008

OTHER PUBLICATIONS

Zhao et.al.,A Novel Scheme of Measuring Instrument Calibration,Chineses Journal of Scientific Instrument,Aug. 31, 2003,p. 442-443,vol. 24-4,China Academic Journal Electronic Publishing House,China.
Li et.al.,A Method of Calibrating Multimeter,Chineses Journal of Scientific Instrument,Dec. 31, 1995,pp. 33-35,issue No. NO.8,China Academic Journal Electronic Publishing House,China.

* cited by examiner

*Primary Examiner* — Luna Champagne
(74) *Attorney, Agent, or Firm* — Altis Law Group, Inc.

(57) ABSTRACT

A system and method for testing a multimeter provides a mechanical arm to set a gear of the multimeter. Values displayed on the multimeter are captured by a camera. The computer obtains the displayed values from captured images using a difference image method. If a difference between each two obtained values is in an allowable error range of the multimeter, the computer displays that the gear is qualified. If the difference between each two obtained values is not in the allowable error range, the computer displays that the gear is out of tolerance.

12 Claims, 8 Drawing Sheets

| Character \ i | 1 | 2 | 3 | 4 | 5 | 6 | 7 | 8 |
|---|---|---|---|---|---|---|---|---|
| "1"/"1." | 0 | 0 | 0 | 0 | 1 | 1 | 0 | 0/1 |
| "2"/"2." | 1 | 0 | 1 | 1 | 0 | 1 | 1 | 0/1 |
| "3"/"3." | 1 | 0 | 0 | 1 | 1 | 1 | 1 | 0/1 |
| "4"/"4." | 0 | 1 | 0 | 0 | 1 | 1 | 1 | 0/1 |
| "5"/"5." | 1 | 1 | 0 | 1 | 1 | 0 | 1 | 0/1 |
| "6"/"6." | 1 | 1 | 1 | 1 | 1 | 0 | 1 | 0/1 |
| "7"/"7." | 1 | 0 | 0 | 0 | 1 | 1 | 0 | 0/1 |
| "8"/"8." | 1 | 1 | 1 | 1 | 1 | 1 | 1 | 0/1 |
| "9"/"9." | 1 | 1 | 0 | 1 | 1 | 1 | 1 | 0/1 |
| "0"/"0." | 1 | 1 | 1 | 1 | 1 | 1 | 0 | 0/1 |

FIG. 8

SYSTEM AND METHOD FOR TESTING A MULTIMETER

BACKGROUND

1. Technical Field

Embodiments of the present disclosure relate to electronic device testing systems and methods, and more particularly to a system and method for testing a multimeter.

2. Description of Related Art

A multimeter may be used to read voltage, current, or resistance values of various electrical or computer components. In order to test multimeters, users may have to read and manually input values displayed on a multimeter into a computer because multimeters often cannot be connected to a computer. Thus, the users often have to manually record test results. Therefore, it can be very time-consuming for users to test multimeters.

Therefore, an effective system and method is needed to overcome the above-described shortcomings.

BRIEF DESCRIPTION OF THE DRAWINGS

FIG. 8 is a schematic diagram illustrating one embodiment of a truth table.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
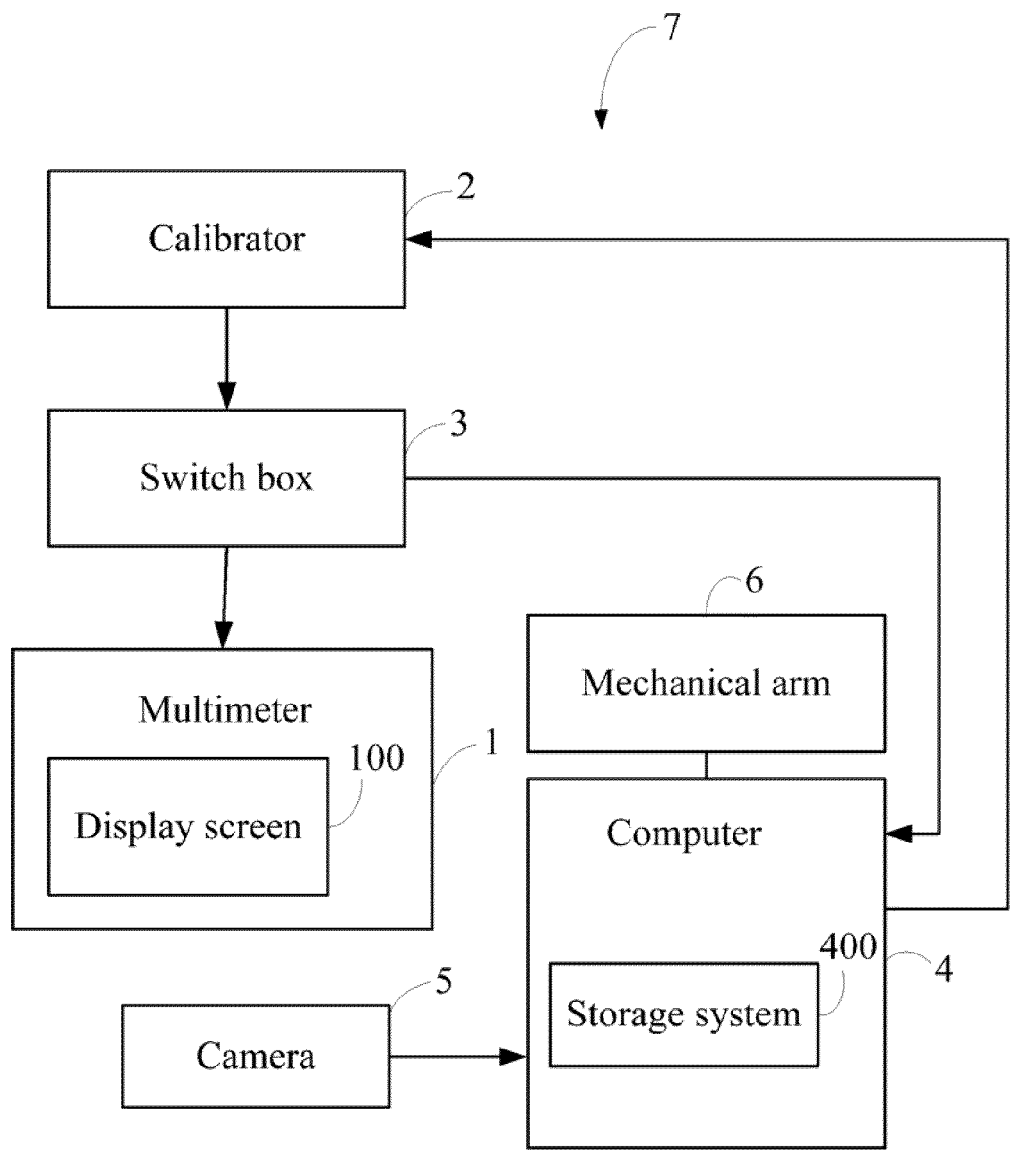
FIG. 1 is a block diagram of one embodiment of a system for testing a multimeter.

FIG. 1 is a block diagram of one embodiment of a system 7 for testing a multimeter 1. The system 7 includes the multimeter 1, a calibrator 2, a switch box 3, a computer 4, a camera 5, and a mechanical arm 6. In one embodiment, the computer 4 includes a storage system 400. The storage system 400 stores an allowable error range of the multimeter 1 and a truth table. In one embodiment, the truth table is shown in FIG. 8.

The multimeter 1 includes a plurality of gears (e.g. voltage gears). The calibrator 2 includes a plurality of gears corresponding to gears of the multimeter 1. Each gear of the calibrator 2 is connected to the corresponding gear of the multimeter 1 via a switch of the switch box 3. For example, a voltage gear of the calibrator 2 is connected to the voltage gear of the multimeter 1 via a switch of the switch box 3.

The calibrator 2 and the switch box 3 are connected to the computer 4 using a communication protocol, such as the recommended standard 232 (RS-232) protocol. When the switch of the switch box 3 is closed, the switch box 3 sends a signal to the computer 4 to signal that the gear of the calibrator 2 has been connected to the gear of the multimeter 1. After receiving the signal, the computer 4 sends an instruction to the calibrator 2 to signal the calibrator 2 to send an analog signal to the multimeter 1. In one embodiment, the analog signal may be a voltage signal or a current signal. For example, if the switch box 3 closes a switch that connects a voltage gear of the multimeter 1 with a voltage gear of the calibrator 2, then the analog signal sent from the calibrator 2 is a voltage signal. The multimeter 1 transforms the analog signal into a digital signal, and displays a value corresponding to the digital signal on a display screen 100 of the multimeter 1.

The camera 5 may be installed in the computer 4, or may be connected to the computer 4 via a universal serial bus (USB) port. The camera 5 captures an image of the displayed values on the multimeter 1 every predetermined time interval. In one embodiment, the predetermined time interval may be about 200 ms. The computer 4 generates a test report according to the captured images. The gears of the multimeter 1 can be set by the mechanical arm 6. The mechanical arm 6 is connected to the computer 4 using a communication protocol, such as the recommended standard 232 (RS-232) protocol.

Figure 2:
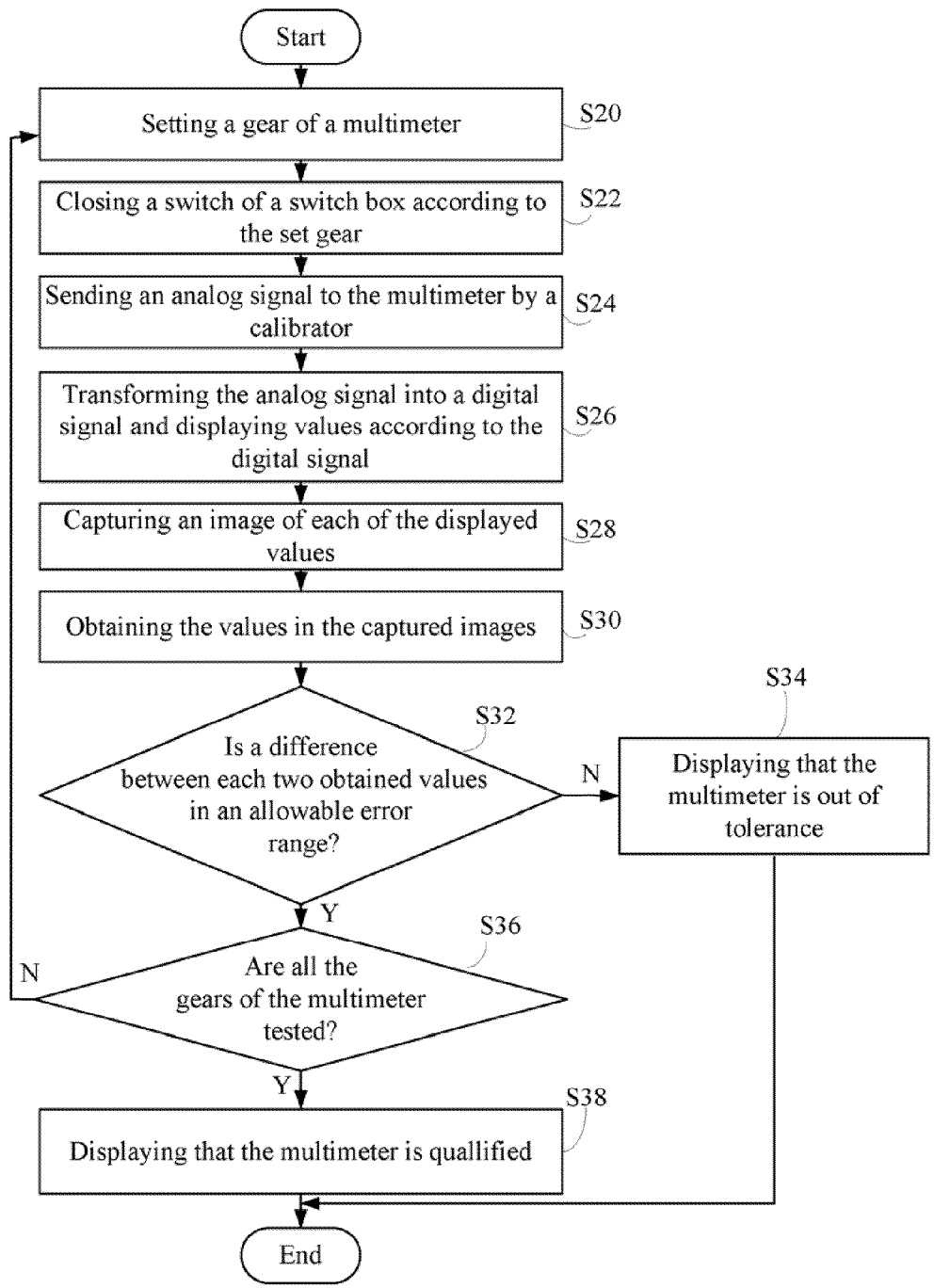
FIG. 2 is flowchart of one embodiment of a method for testing a multimeter.

FIG. 2 is flowchart of one embodiment of a method for testing a multimeter. Depending on the embodiment, additional blocks may be added, others removed, and the ordering of the blocks may be changed.

In block S20, the mechanical arm 6 sets a gear of the multimeter 1.

In block S22, a switch of the switch box 3 connected to the set gear of the multimeter 1 is closed. For example, the mechanical arm 6 may set voltage gear of the multimeter 1, then the switch connected to the voltage gear of the multimeter 1 is closed.

In block S24, the calibrator 2 sends an analog signal to the multimeter 1.

In block S26, the multimeter 1 transforms the analog signal to a digital signal and displays values according to the digital signal on the display screen 100.

In block S28, the camera 5 captures an image of each of the displayed values.

In block S30, the computer 4 obtains the values in the images captured in a predetermined time interval.

In block S32, the computer detects if a difference between each two obtained values is in the allowable error range of the multimeter 1. If the difference between each two obtained values is in the allowable error range of the multimeter 1, the procedure goes to block S36. If the difference between any two obtained values is not in the allowable error range of the multimeter 1, the procedure goes to S34.

In block S34, the computer 1 generates a test report, and displays that the multimeter is out of tolerance on the test report.

In block S36, the computer 4 detects if all the gears of the multimeter 1 are tested. If there is any gears of the multimeter 1 are not tested, the procedure returns to block S20. If all the gears are tested, in block S38, the computer 4 displays that the multimeter 1 is qualified on the test report.

Figure 3:
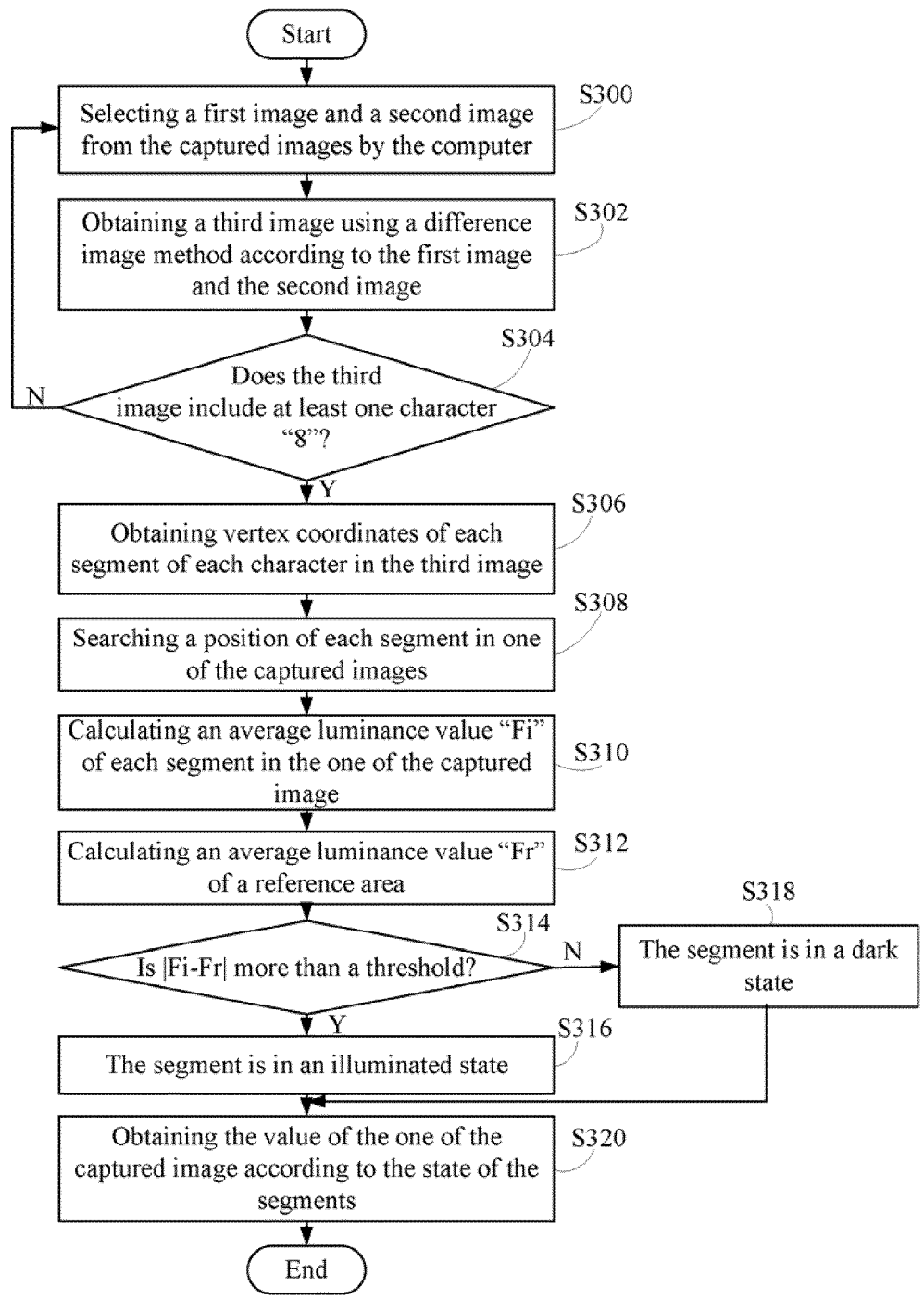
FIG. 3 is a block diagram of one embodiment of a detailed description of block S30 in FIG. 2.

FIG. 3 is a block diagram of one embodiment of detailed description of block S30 in FIG. 2. Depending on the embodiment, additional blocks may be added, others removed, and the ordering of the blocks may be changed.

Figure 4:
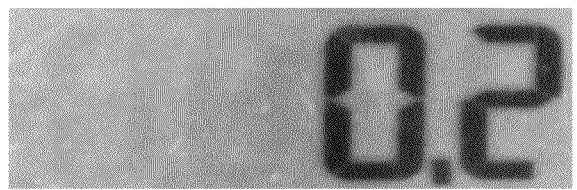
FIG. 4 is a schematic diagram illustrating one embodiment of a first image in block S300 in FIG. 3.
Figure 5:
FIG. 5 is a schematic diagram illustrating one embodiment of a second image in block S304 in FIG. 3.

In block S300, the computer 4 selects two images from the captured images, where the captured images represent displayed values on the display screen 100. The two images are defined as a first image and a second image. In one embodiment, the camera 5 may capture ten images of the displayed values which are displayed on the display screen 100. As shown in FIG. 4, the first displayed value is 0.2. The first displayed value includes three characters: "0", ".", and "2". As shown in FIG. 5, the second displayed value is 8.21. The second displayed value includes four characters: "8", ".", "2", and "1".

Figure 6:
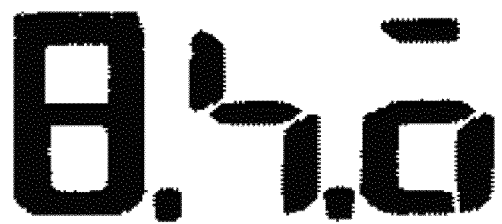
FIG. 6 is a schematic diagram illustrating one embodiment of a third image in block S306 in FIG. 3.

In block S302, the computer 4 obtains a third image using a difference image method according to the first image and the second image. It may be understood that the difference image method is a method of comparing the gray values of the pixels in the first image and the gray values of the corresponding pixels in the second image. A pixel will be displayed in the third image if the gray value of the pixel in the first image is different from the gray value of the corresponding pixel in the second image. The pixel will not be displayed in the third image if the gray value of the pixel in the first image is the same as the gray value of the corresponding pixel in the second image. The third image is shown in FIG. 6, for example. It may be understood that resolution of the first image is the same as resolution as the second image, thus each of the first image and the second image have the same number of pixels.

In block S304, the computer 4 checks if the third image includes at least one character "8". If the third image includes at least one character "8", the procedure goes to block S306. If the third image does not include the character "8", the procedure returns to block S300.

Figure 7:
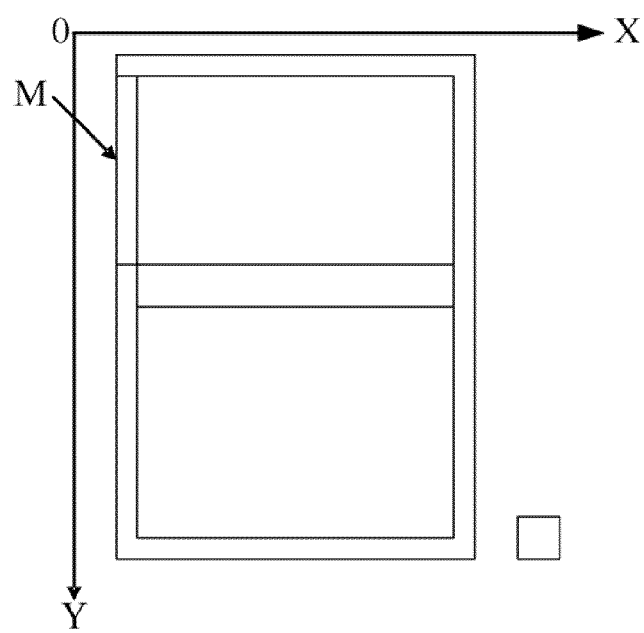
FIG. 7 is a schematic diagram illustrating one embodiment of a character in an image.

In block S306, the computer 4 obtains vertex coordinates of each segment of each character in the third image. As shown in FIG. 6, the third image includes four characters. The first character is "8". In FIG. 7, the first character "8" includes seven segments. One of the seven segments is defined as M segment. The M segment is a rectangle including four vertices. Vertex coordinates of the four vertices are A(x1, y2), "B(x2, y2)", "C(x1, y1)", and "D(x2, y1)".

In block S308, the computer 4 searches a position of each segment in one of the captured images corresponding to the segment in the third image according to the vertex coordinates of the segment in the third image.

In block S310, the computer 4 calculates an average luminance value "Fi" of all the pixel points of each segment in the one of the captured images. The "Fi" denotes the i segment of the segment. For example, the M segment is the first segment of the character "8", so the average luminance value of the M segment is "F1".

In block S312, the computer 4 calculates an average luminance value "Fr" of a reference area in the one of the captured image. The reference area is the area in the captured image excluding the area of the characters.

In block S314, the computer 4 checks if |Fi−Fr| is more than a threshold value. In one embodiment, the threshold value may be 125. If |Fi−Fr| is more than the threshold value, the procedure goes to block S316. If |Fi−Fr| is not more than the threshold value, the procedure goes to block S318.

In block S316, the segment is determined in an illuminated state. In one embodiment, the state value of the segment is defined as 1.

In block S318, the segment is determined in a dark state. In one embodiment, the state value of the segment is defined as 0.

In block S320, the computer 4 obtains the value of the one of the captured image according to the state of the segment and the truth table stored in the storage system 400.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for testing a multimeter, the system comprising a calibrator connected to the multimeter, a computer connected to the calibrator, a mechanical arm and a camera connected to the computer, wherein:
   the mechanical arm is operable to set a gear of the multimeter;
   the calibrator is operable to send an analog signal to the multimeter according to the set gear;
   the multimeter is operable to transform the analog signal into a digital signal, and to display values according to the digital signal;
   the camera is operable to capture an image of each of the displayed values; and
   the computer is operable to obtain the values in the images captured every predetermined time interval, detect if a difference between each two obtained values is in an allowable error range of the multimeter, and generate a test report according to the detection result.

2. The system of claim 1, further comprising a switch box comprising a plurality of switches, each of the plurality of the switches connected to a gear of the calibrator with a corresponding gear of the multimeter.

3. The system of claim 1, wherein the computer is further operable to obtain a third image using a difference image method according to two images of the captured images.

4. The system of claim 3, wherein the computer is further to obtain vertex coordinates of each segment of each character in the third image, to search a position of each segment in each of the captured images according to the vertex coordinates of each segment.

5. The system of claim 4, wherein the computer is further to calculate an average luminance value "Fi" of each segment in the one of the captured image and an average luminance value "Fr" of a reference area in the one of the captured image, to determine that a segment is in an illuminated state if |Fi−Fr| of the segment is more than a threshold value and determine that a segment is in a dark state if |Fi−Fr| of the segment is not more than the threshold value, and to obtain the value of the one of the captured image according to the state of the segment and a truth table.

6. The system of claim 3, wherein the third image comprises at least the character "8".

7. The system of claim 5, wherein the reference area is the area in the captured image excluding the area of the characters.

8. A method for testing a multimeter, the method comprising:
   (a) setting a gear of the multimeter by a mechanical arm;
   (b) sending an analog signal to the multimeter according to the set gear by a calibrator connected to the multimeter;
   (c) transforming the analog signal into a digital signal by the multimeter and displaying values according to the digital signal;
   (d) capturing an image of each of the displayed values;
   (e) obtaining the values in the images captured every predetermined time interval;
   (f) detecting if a difference between each two obtained values is in an allowable error range of the multimeter; and
   (g) generating a test report according to the detection result.

9. The method of claim 8, further comprising:

displaying that the multimeter is qualified on the test report if the difference between each two obtained values is in the allowable error range; and displaying that the multimeter is out of tolerance on the test report if the difference between any two obtained values is not in the allowable error range.

10. The method of claim 8, wherein block (e) comprises:

obtaining a third image using a difference image method according to two images of the captured images;

obtaining vertex coordinates of each segment of each character in the third image;

searching a position of each segment in each of the captured images according to the vertex coordinates of each segment;

calculating an average luminance value "Fi" of each segment and an average luminance value "Fr" of a reference area in the one of the captured image;

determining that a segment is in an illuminated state if |Fi−Fr| of the segment is more than a threshold value;

determining that a segment is in a dark state if |Fi−Fr| of the segment is not more than the threshold value; and obtaining the value of each of the captured images according to the states of the segments in the captured image and a truth table stored in a computer.

11. The method of claim 10, wherein the third image comprises at least the character "8".

12. The method of claim 10, wherein the reference area is the area in the captured image excluding the area of the characters.

* * * * *